United States Patent
Inoue et al.

(10) Patent No.: US 10,072,759 B2
(45) Date of Patent: Sep. 11, 2018

(54) SLIDING COMPONENT

(71) Applicant: EAGLE INDUSTRY CO., LTD., Minato-ku, Tokyo (JP)

(72) Inventors: Hideyuki Inoue, Tokyo (JP); Takeshi Hosoe, Tokyo (JP); Yuta Negishi, Tokyo (JP); Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 15/419,989

(22) Filed: Jan. 30, 2017

(65) Prior Publication Data

US 2017/0138482 A1    May 18, 2017

Related U.S. Application Data

(62) Division of application No. 14/431,733, filed as application No. PCT/JP2014/050402 on Jan. 14, 2014, now Pat. No. 9,951,873.

(30) Foreign Application Priority Data

Jan. 16, 2013  (JP) .................................. 2013-005494

(51) Int. Cl.
*F16J 15/34*  (2006.01)
*F16J 15/16*  (2006.01)

(52) U.S. Cl.
CPC ........... *F16J 15/342* (2013.01); *F16J 15/162* (2013.01); *F16J 15/3412* (2013.01)

(58) Field of Classification Search
CPC ...... F16J 15/342; F16J 15/162; F16J 15/3412; F16J 15/16; F16J 15/34

(Continued)

(56) References Cited

U.S. PATENT DOCUMENTS 3,085,808 A * 4/1963 Williams ............. F16J 15/3416
                                                         277/388
3,410,565 A * 11/1968 Williams ............... F16J 15/342
                                                         277/348

(Continued)

FOREIGN PATENT DOCUMENTS

CN      101749431 A    6/2010
EP       2626604 A1    8/2013

(Continued)

OTHER PUBLICATIONS

A Non-Final Rejection issued by U.S. Patent and Trademark Office, dated Mar. 31, 2017, for related U.S. Appl. No. 14/431,733.

(Continued)

*Primary Examiner* — Nathan Cumar
(74) *Attorney, Agent, or Firm* — Hayes Soloway P.C.

(57) ABSTRACT

In an embodiment, a sliding part is provided with a mechanism to generate dynamic pressure by means of relative sliding of a pair of sealing faces of the sliding part, which is characterized in that one sealing face is provided with a land 10 for generating dynamic pressure facing the high-pressure fluid side and a seal area 11 facing the low-pressure fluid side, wherein the land 10 and seal area 11 are positioned away from each other in the radial direction and the areas of the sealing face other than the land 10 and seal area 11 are formed lower than these areas to constitute fluid communication paths 12. The lands 10 have different lengths in the radial direction. The fluid entering the grooves for generating dynamic pressure formed on the sealing face is allowed to circulate.

6 Claims, 15 Drawing Sheets

(58) Field of Classification Search
USPC .......................................................... 277/400
See application file for complete search history.

(56) References Cited

U.S. PATENT DOCUMENTS

| | | | |
|---|---|---|---|
| 3,656,227 A | 4/1972 | Weinand ........................ 29/530 | |
| 5,092,612 A | 3/1992 | Victor et al. | |
| 5,201,531 A | 4/1993 | Lai ....................... F16J 15/3412 | |
| 5,441,283 A | 8/1995 | Peeht et al. ................... 277/96.1 | |
| 5,492,341 A | 2/1996 | Pecht et al. | |
| 5,498,007 A | 3/1996 | Kulkarni et al. | |
| 5,556,111 A * | 9/1996 | Sedy ................... F16J 15/3412 | |
| | | | 277/400 |
| 5,702,110 A | 12/1997 | Sedy | |
| 5,895,051 A * | 4/1999 | Bowers .................... B62D 5/22 | |
| | | | 180/428 |
| 6,446,976 B1 | 9/2002 | Key et al. | |
| 2003/0178781 A1* | 9/2003 | Tejima ................. F16J 15/3424 | |
| | | | 277/399 |
| 2004/0080112 A1* | 4/2004 | Tejima ................. F16J 15/3404 | |
| | | | 277/306 |
| 2011/0101616 A1 | 5/2011 | Teshima et al. | |

FOREIGN PATENT DOCUMENTS

| | | |
|---|---|---|
| JP | S63033027 U | 3/1988 |
| JP | S63190975 A | 8/1988 |
| JP | H04145267 A | 5/1992 |
| JP | H0755016 A | 3/1995 |
| JP | H09503276 A | 3/1997 |
| JP | H10281299 A | 10/1998 |
| JP | 2005 188651WT * | 7/2005 |
| JP | 2005188651 A | 7/2005 |
| JP | 2009250378 A | 10/2009 |
| JP | 2003343741 A | 12/2013 |
| WO | 9506832 A1 | 3/1995 |
| WO | 2012046749 A1 | 4/2012 |

OTHER PUBLICATIONS

A Second Office Action issued by the State Intellectual Property Office of China, dated Aug. 29, 2016, for Chinese counterpart application No. 201480002574.0.
Definition of groove by Merriam Webster.
Final Office Action issued by U.S. Patent and Trademark Office, dated Oct. 6, 2016, for U.S. Appl. No. 14/431,733.
First Notification of Reason for Refusal issued by the State Intellectual Property Office of China, dated Dec. 24, 2015, with a search report for Chinese counterpart application No. 201480002574.0.
International Search Report (ISR), dated Feb. 10, 2014, issued for International Application No. PCT/JP2014/050402.
Non-Final Office Action issued by U.S. Patent and Trademark Office, dated Apr. 29, 2016, for U.S. Appl. No. 14/431,733.
Notification of Transmittal of Translation of the International Preliminary Report on Patentability (PCT/IB/338) dated Jul. 30, 2015, with International Preliminary Report on Patentability (PCT/IB/373) and Written Opinion of the International Searching Authority (PCT/ISA/237), for corresponding international application PCT/JP2014/050402.
Office Action issued in U.S. Appl. No. 15/419,970, dated Jan. 23, 2018 (21 pgs).
U.S. Appl. No. 14/431,733, filed Mar. 26, 2015, Inoue et al.
Notice of Allowance issued in U.S. Appl. No. 14/431,733, dated Feb. 23, 2018 (22 pgs).
U.S. Appl. No. 14/431,733, filed Mar. 26, 2015.
U.S. Appl. No. 15/419,970, filed Jan. 30, 2017.
U.S. Appl. No. 15/842,855, filed Dec. 14, 2017.
U.S. Appl. No. 15/842,858, filed Dec. 14, 2017.
U.S. Appl. No. 15/842,859, filed Dec. 14, 2017.
U.S. Appl. No. 15/842,862, filed Dec. 14, 2017.
U.S. Appl. No. 15/419,970, filed Jan. 30, 2017, Inoue et al.
U.S. Appl. No. 15/842,855, filed Dec. 14, 2017, Inoue et al.
U.S. Appl. No. 15/842,858, filed Dec. 14, 2017, Inoue et al.
U.S. Appl. No. 15/842,859, filed Dec. 14, 2017, Inoue et al.
U.S. Appl. No. 15/842,862, filed Dec. 14, 2017, Inoue et al.
Office Action issued in U.S. Appl. No. 15/419,970, dated May 11, 2018 (17 pgs).

* cited by examiner

[FIG. 1]
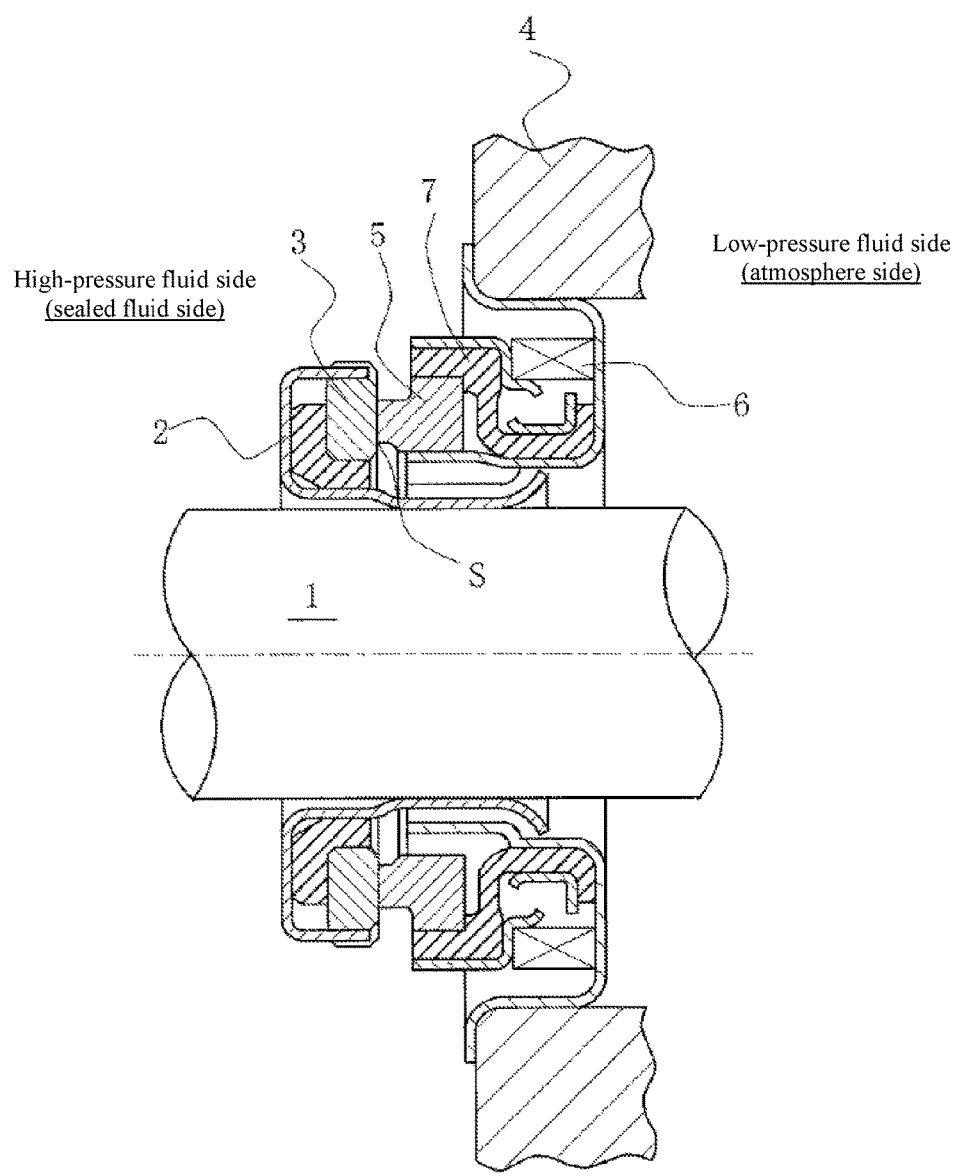

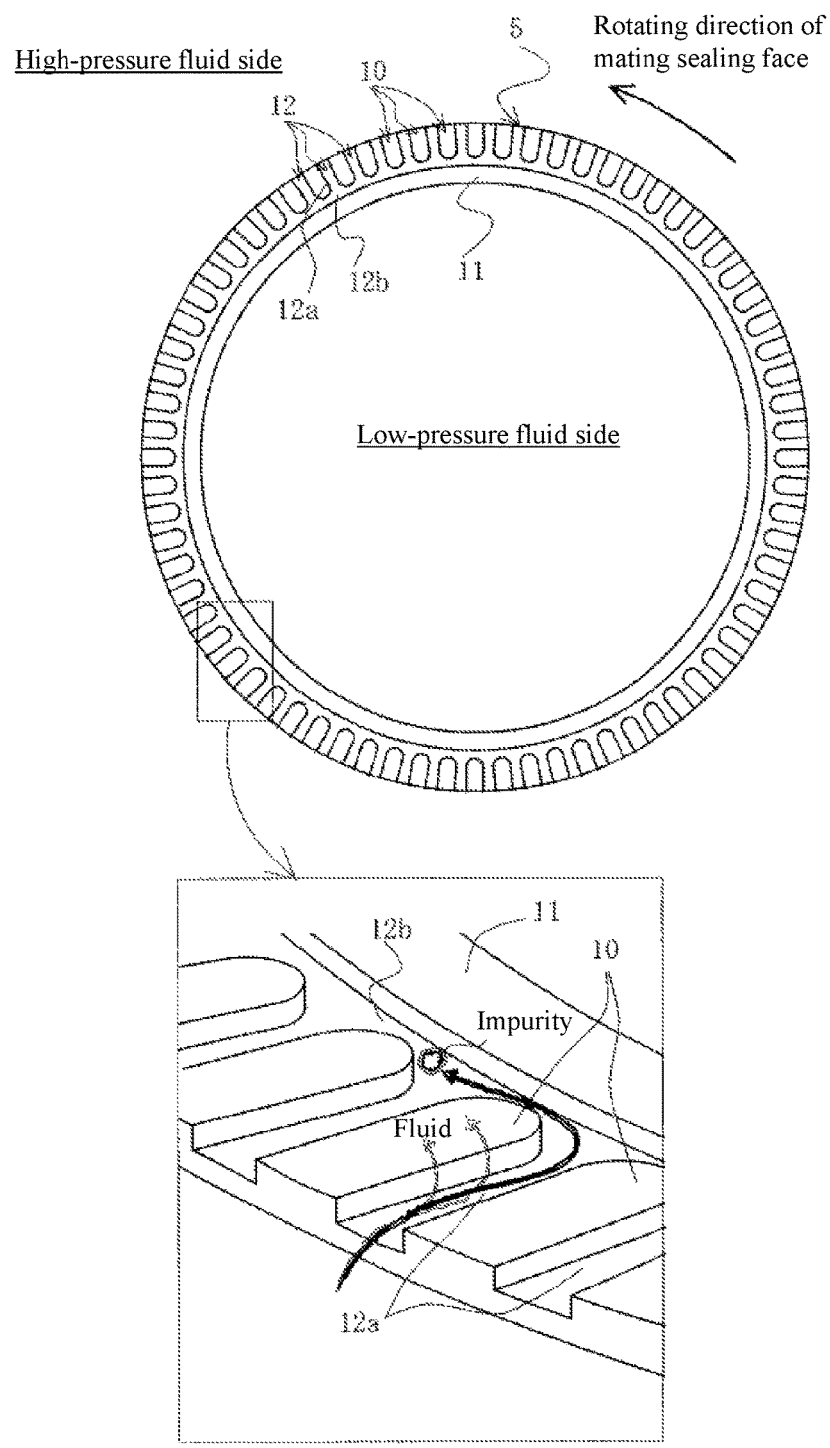
[FIG. 2]

[FIG. 3]
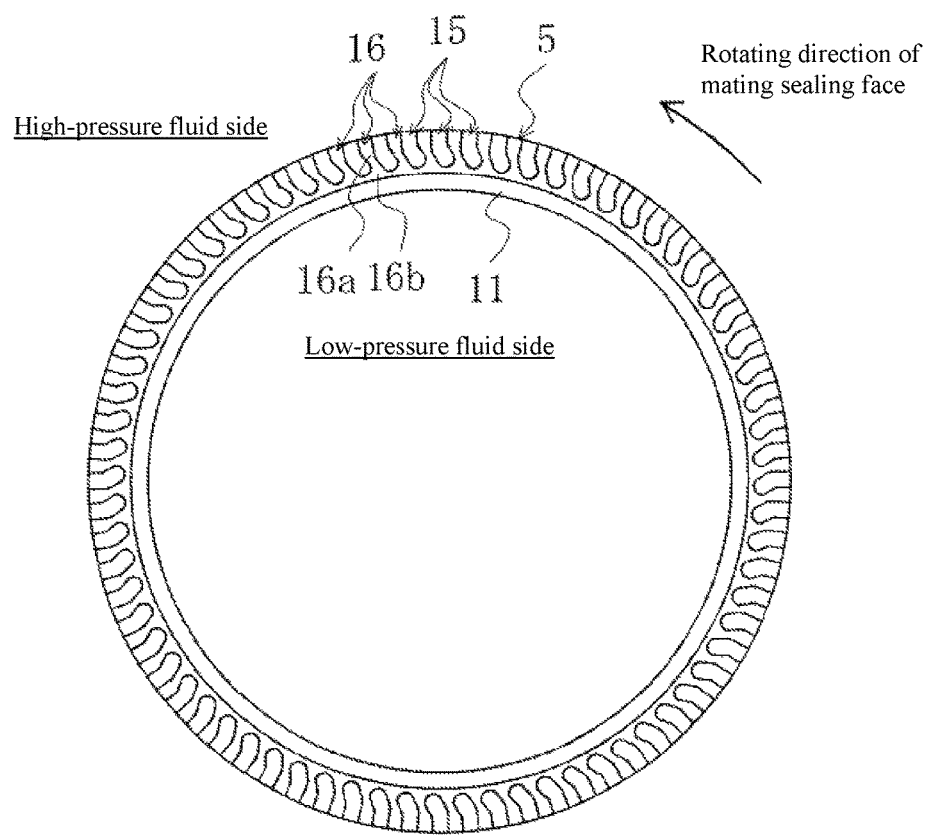

[FIG. 4]
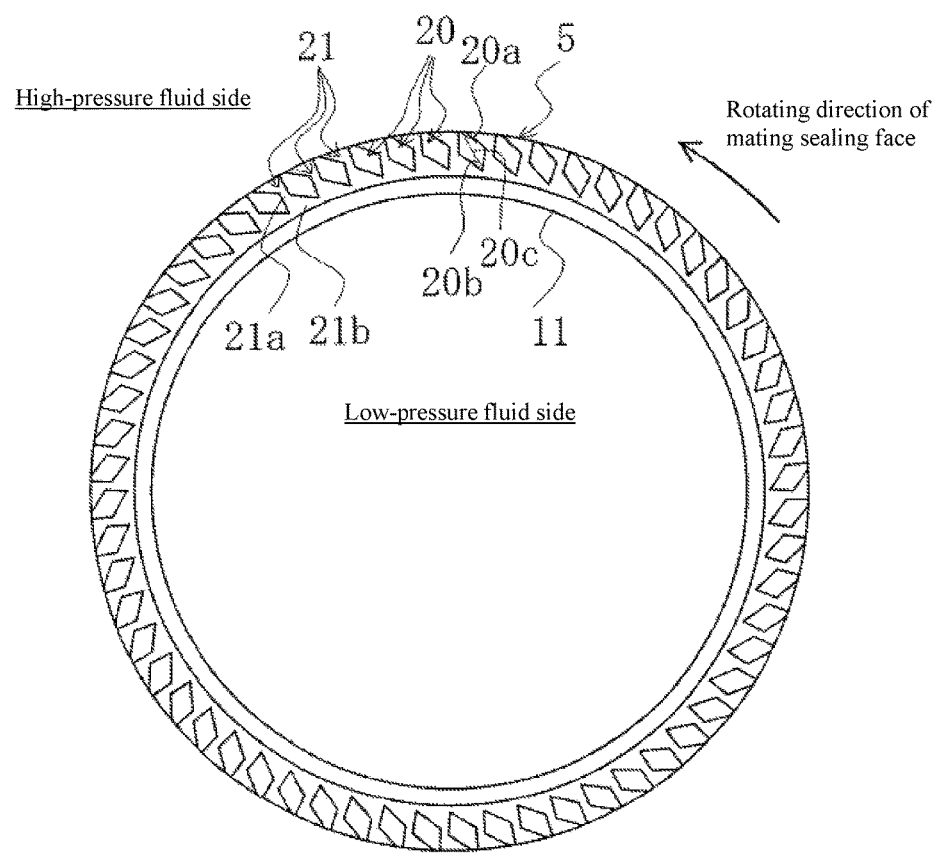

[FIG. 5]
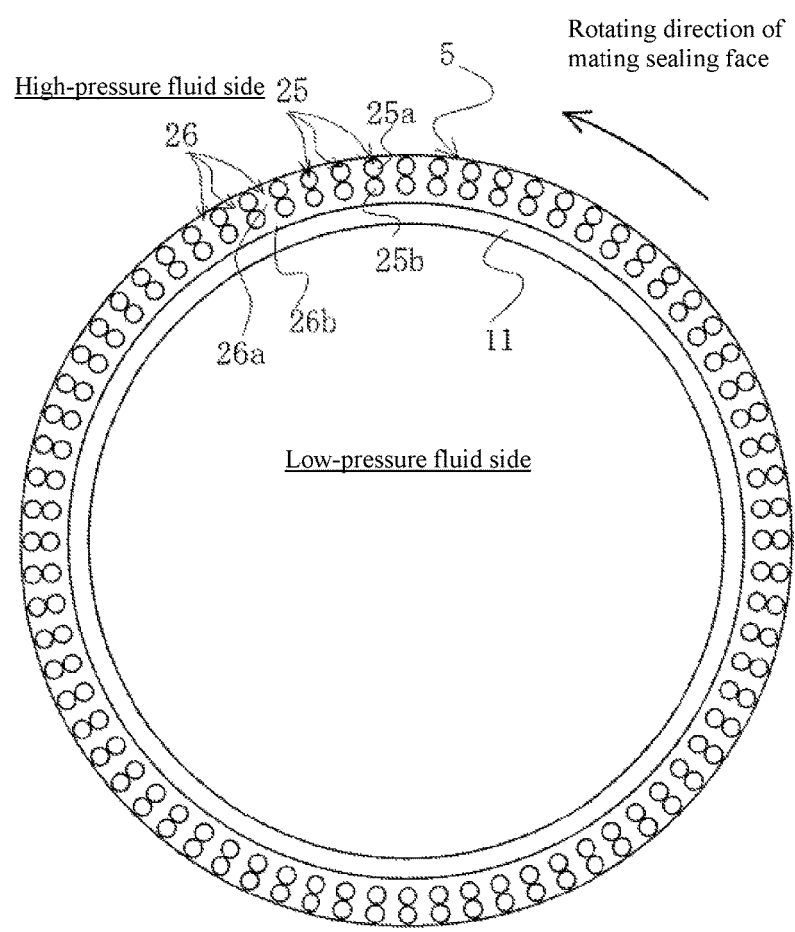

[FIG. 6]
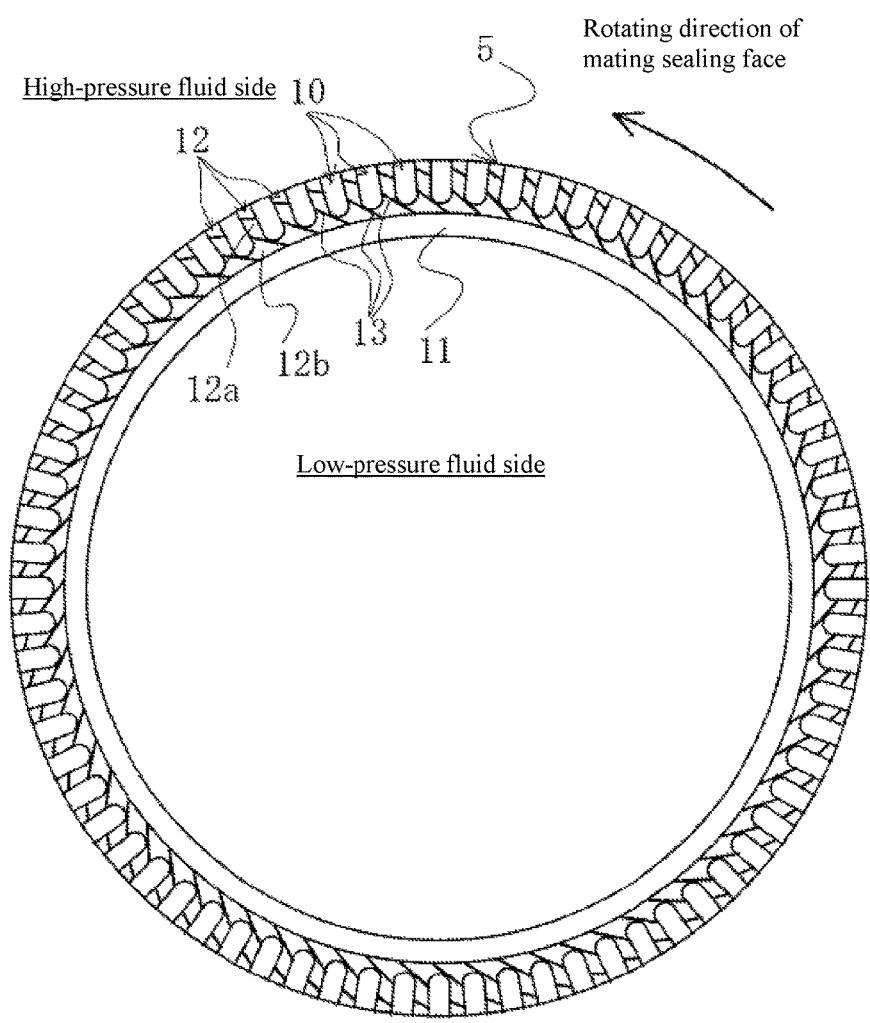

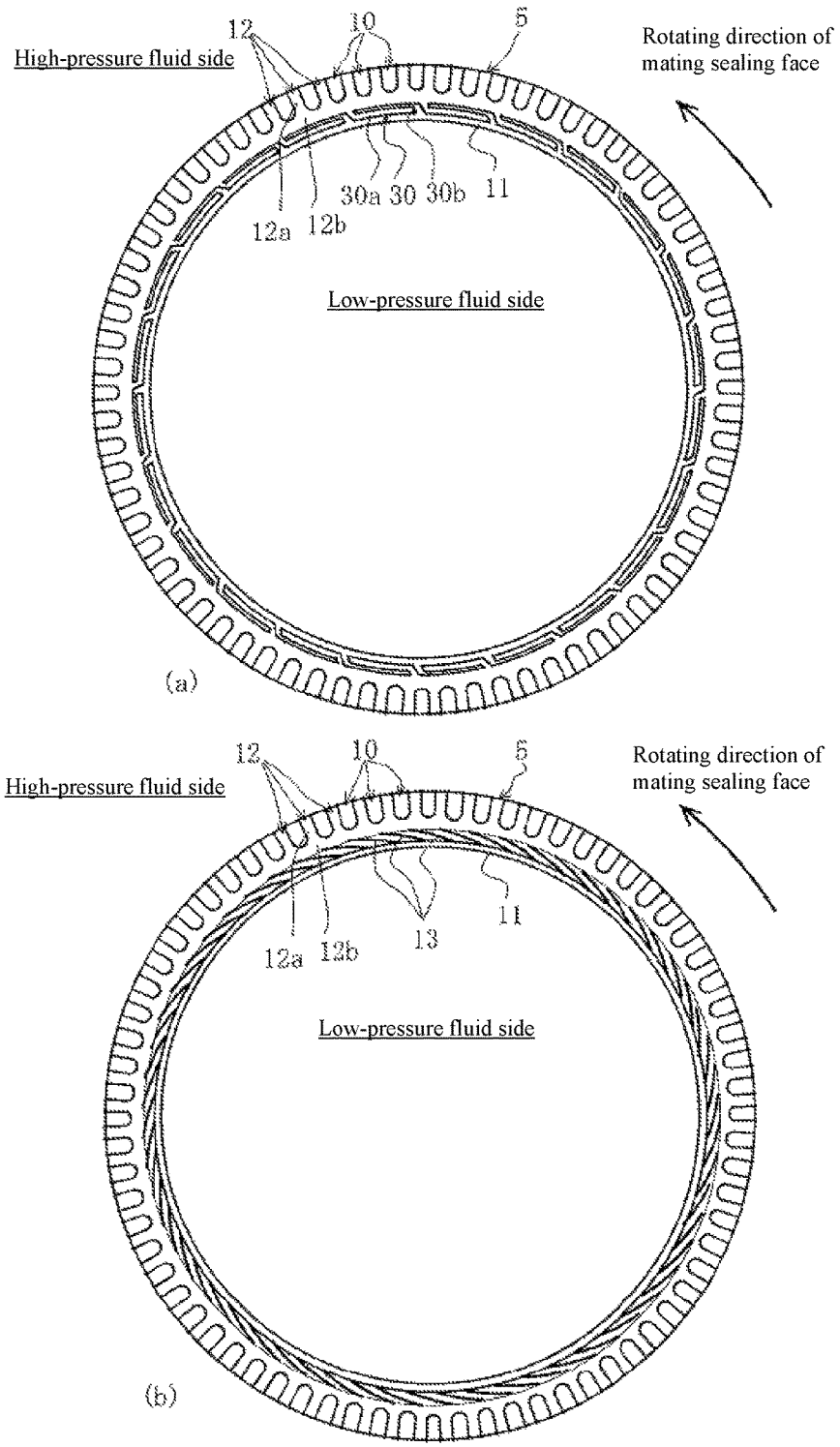

[FIG.8]
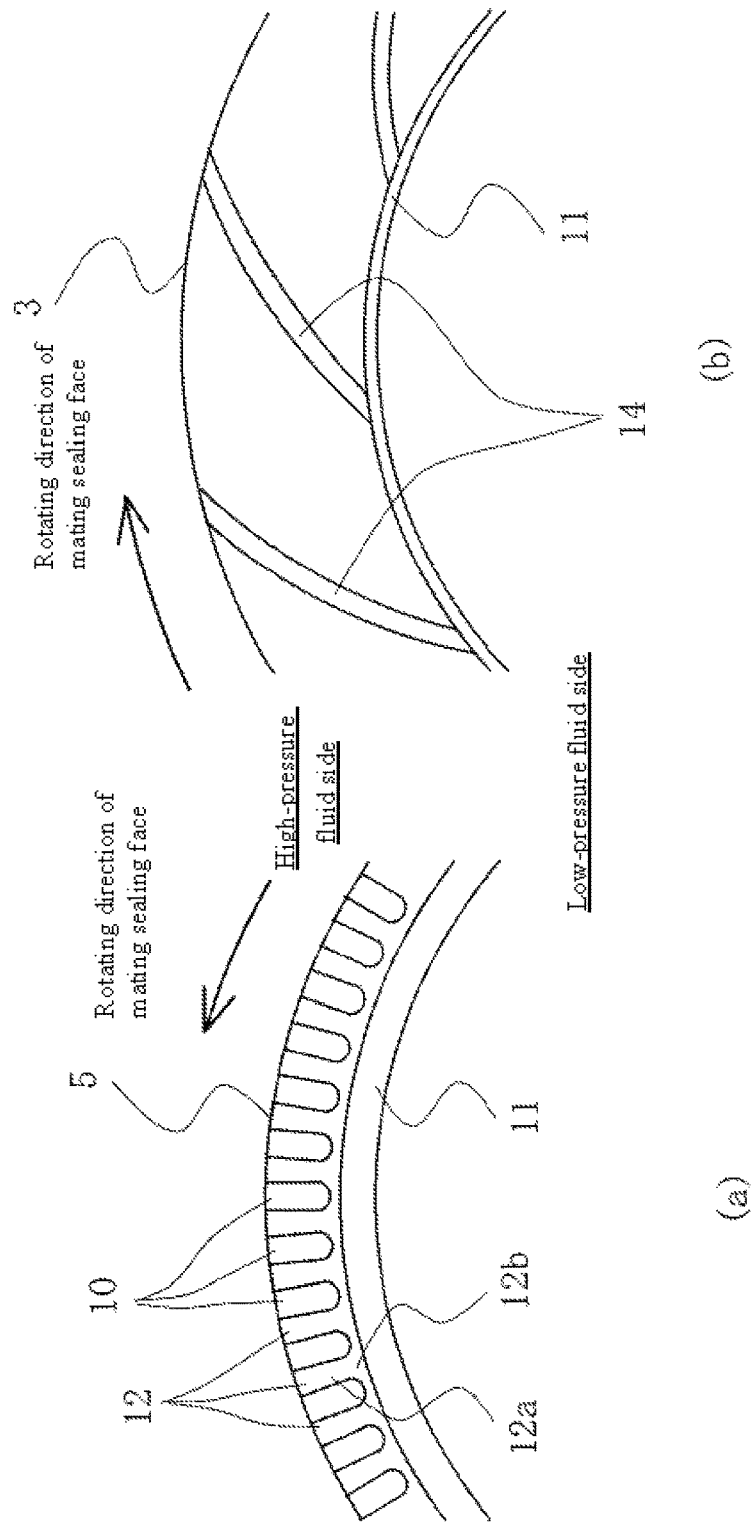

[FIG. 9]
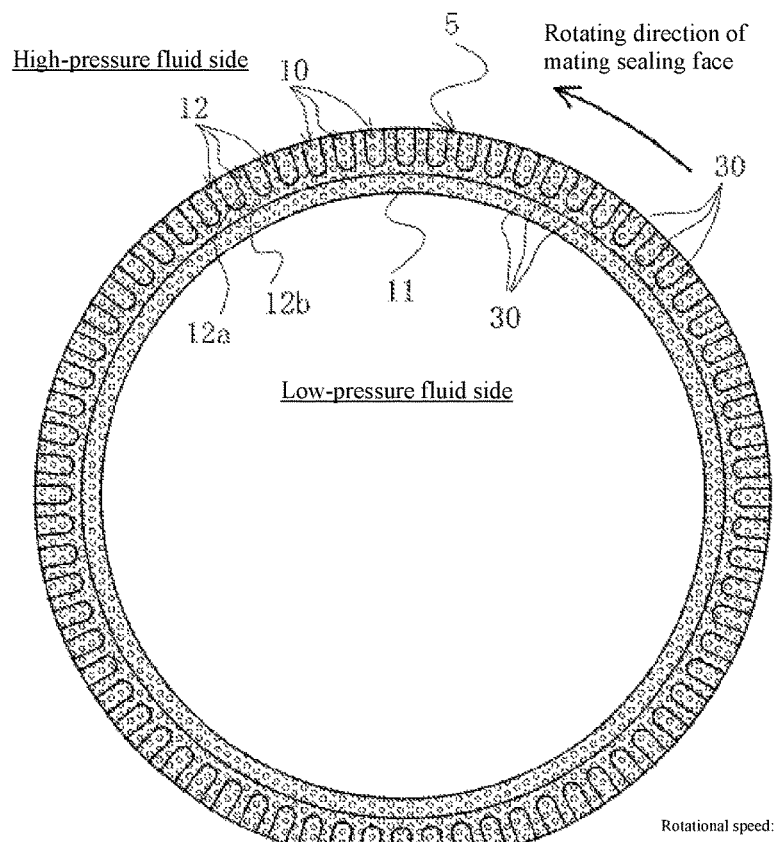
(a)
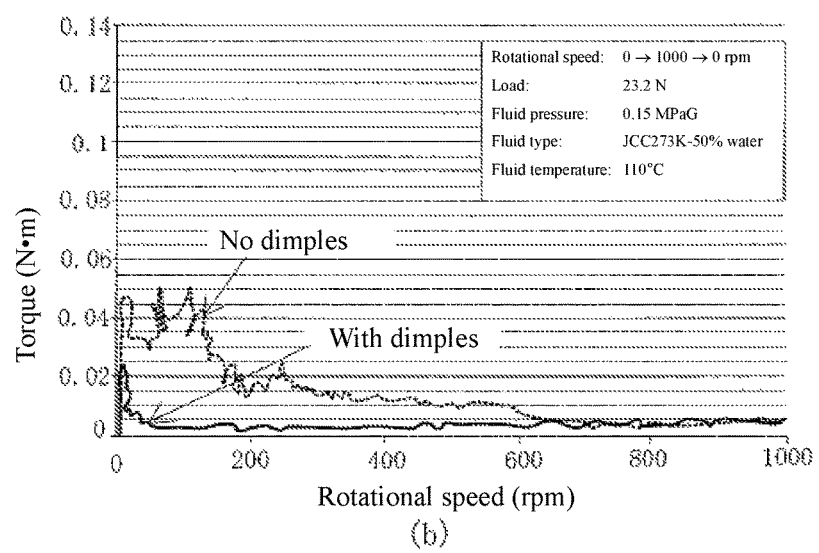
(b)

[FIG. 10]
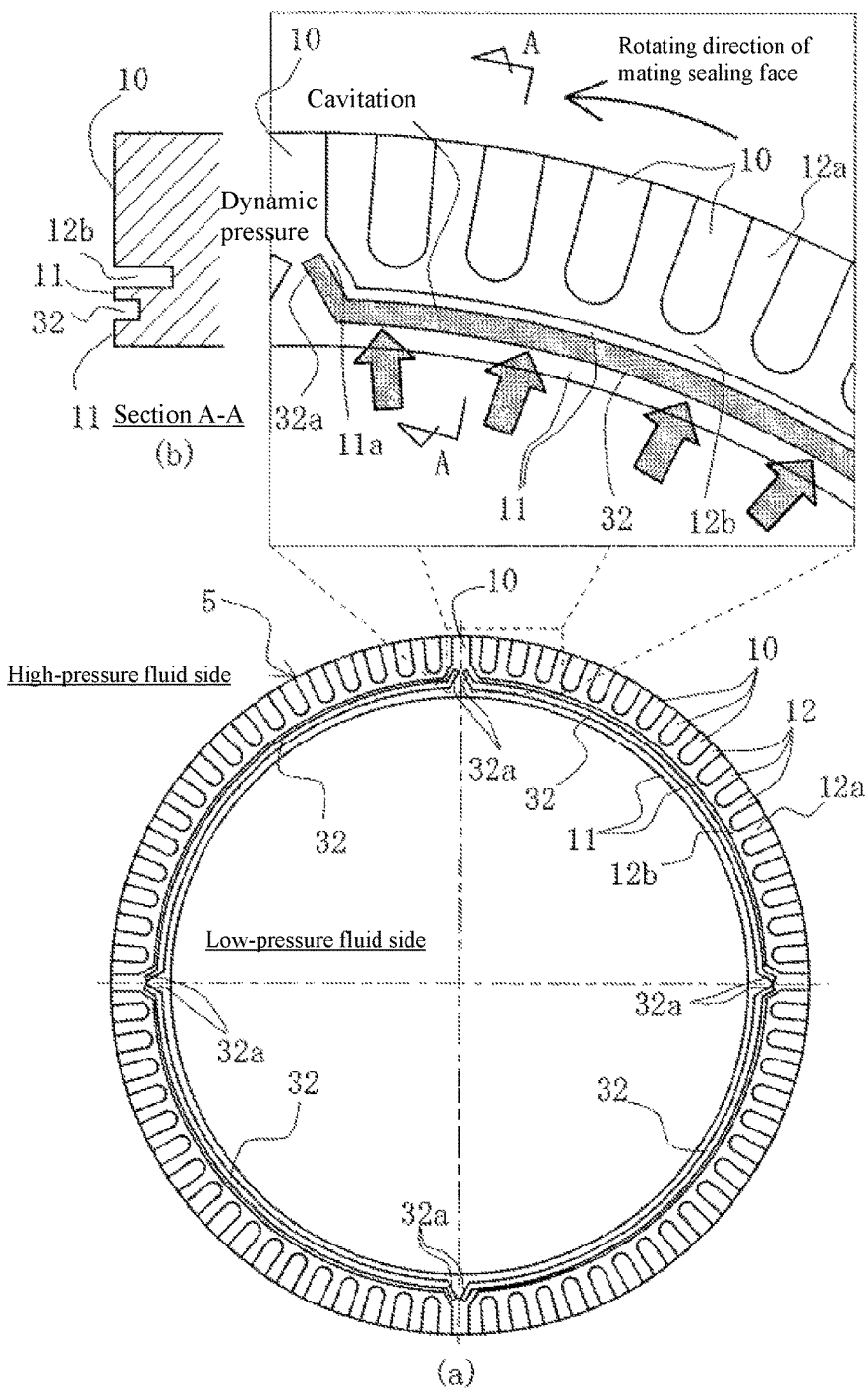

[FIG. 11]
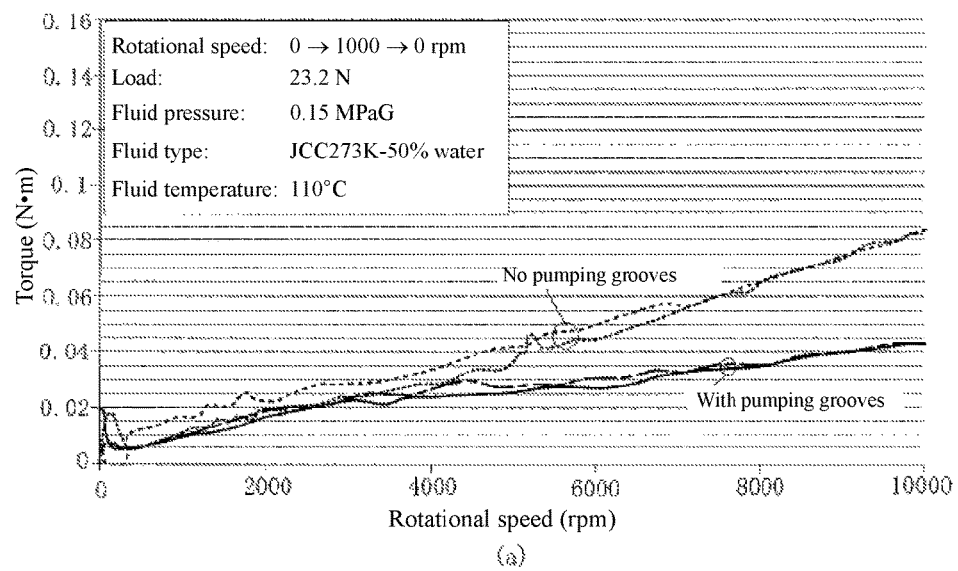
(a)
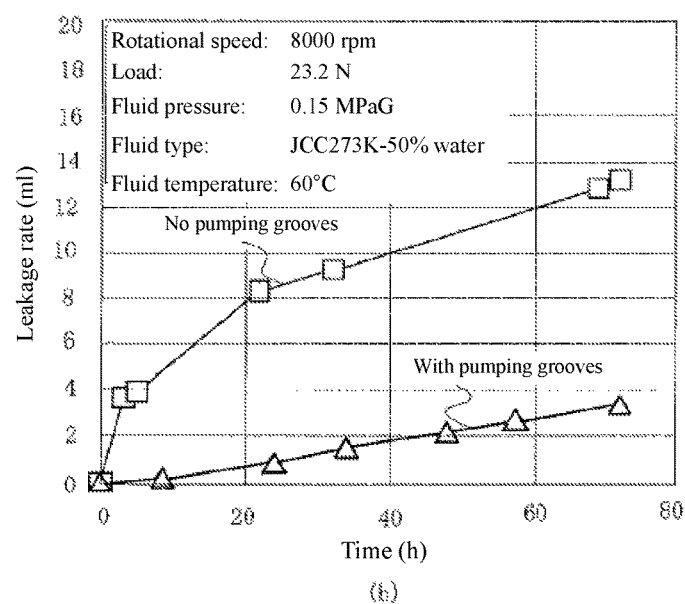
(b)

[FIG. 12]
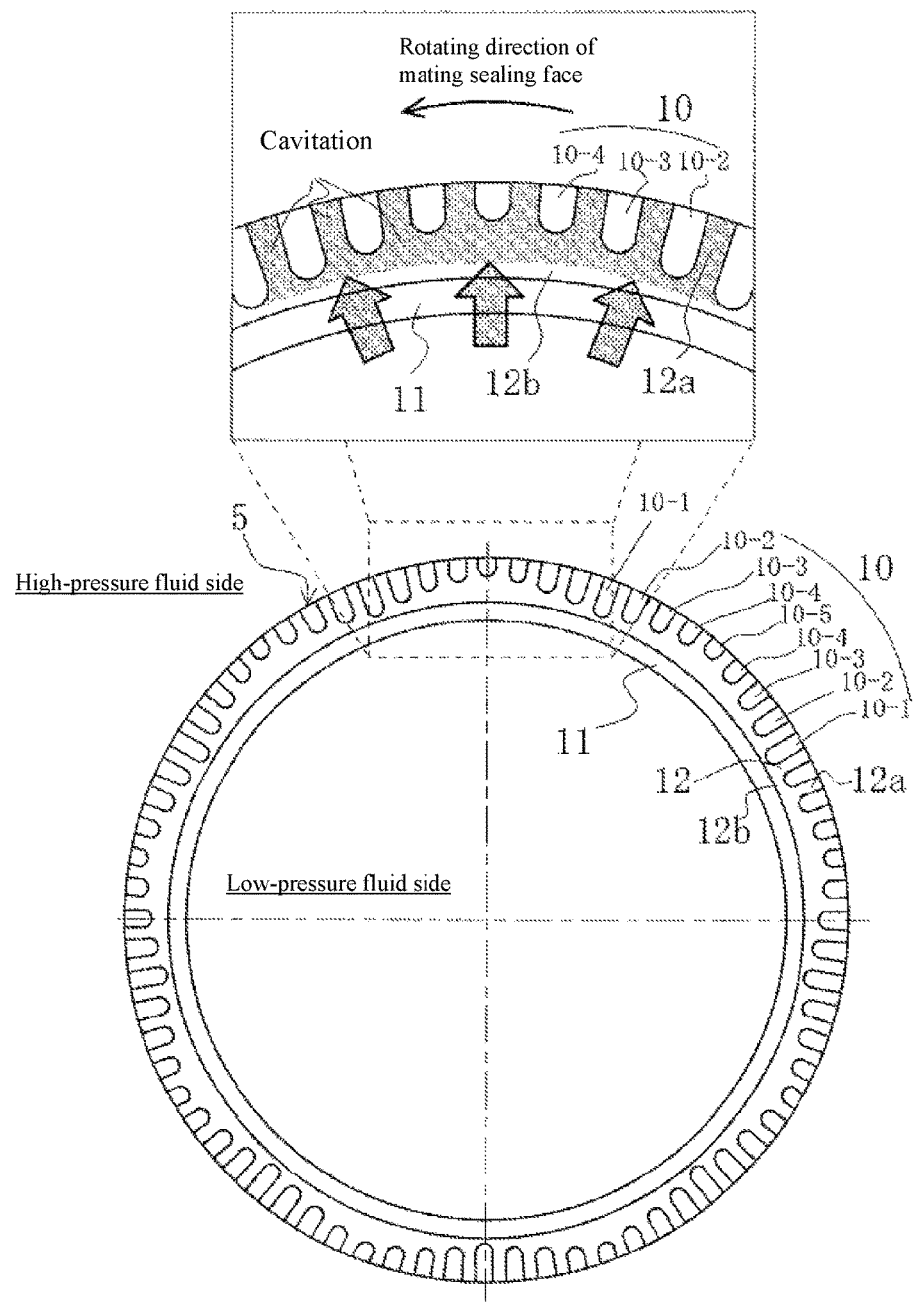

[FIG. 13]
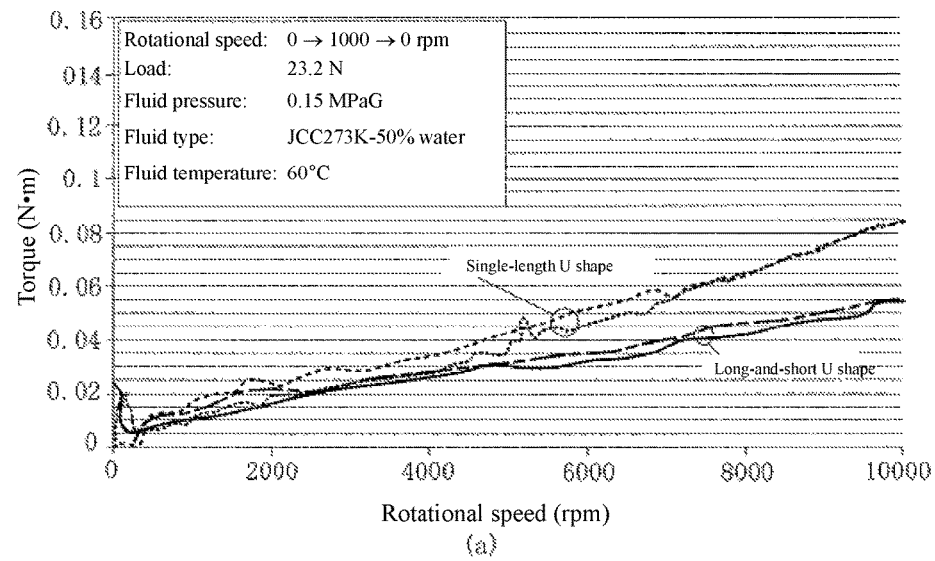
(a)
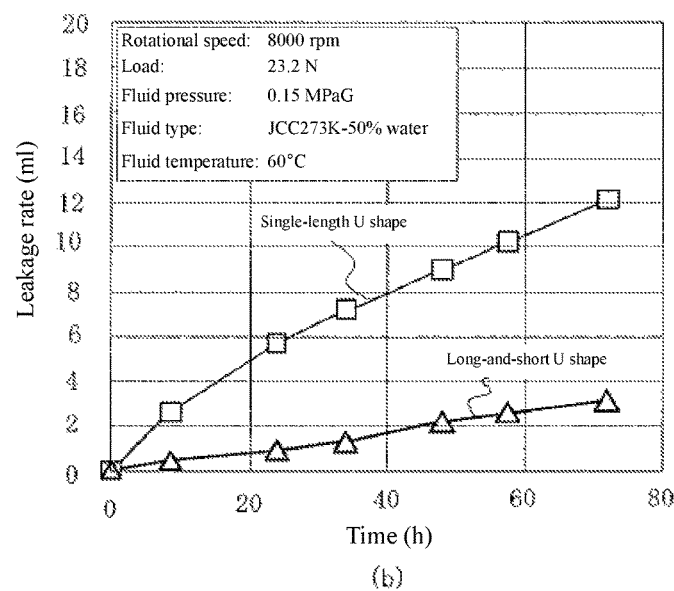
(b)

[FIG. 14]
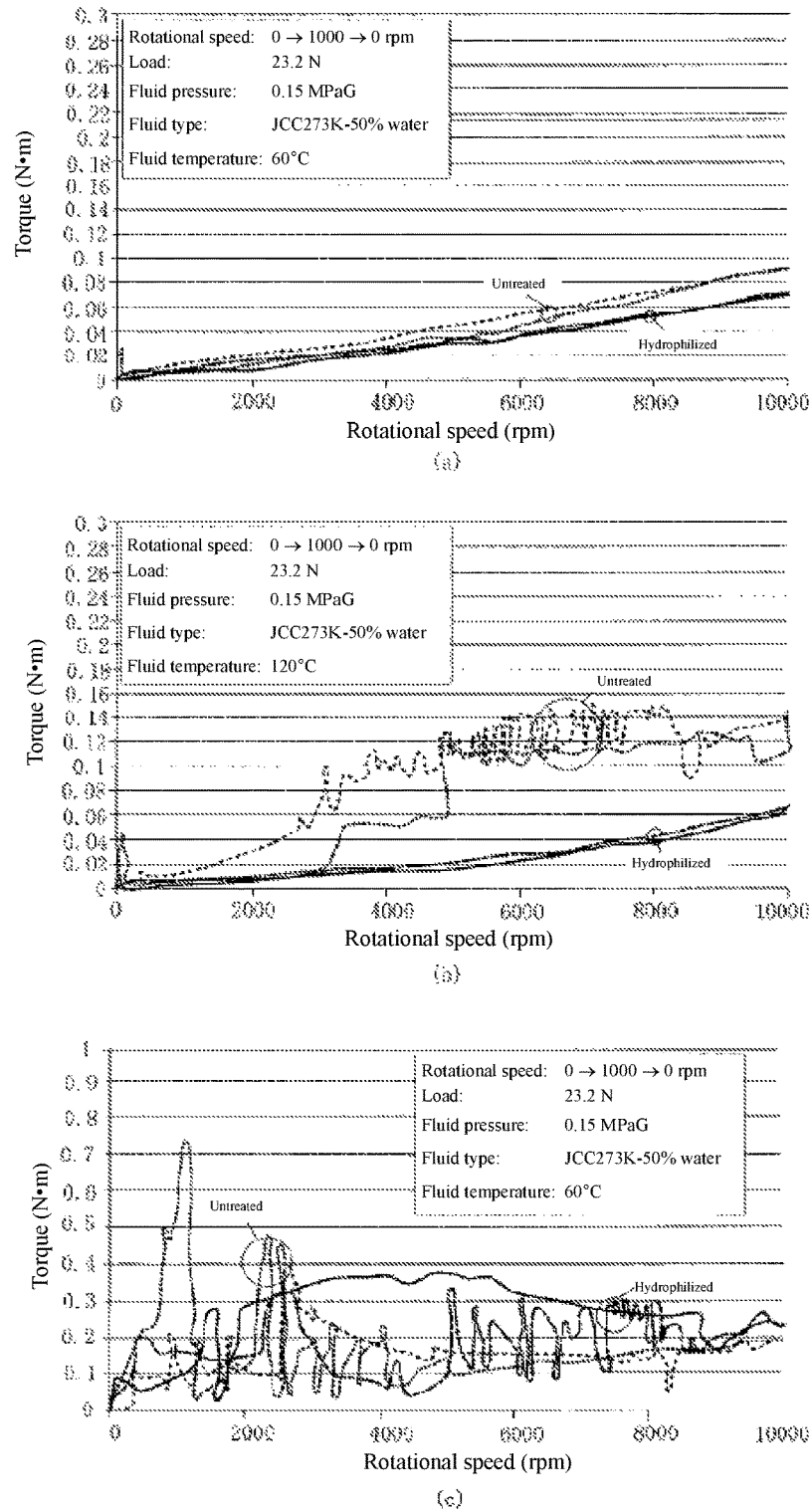

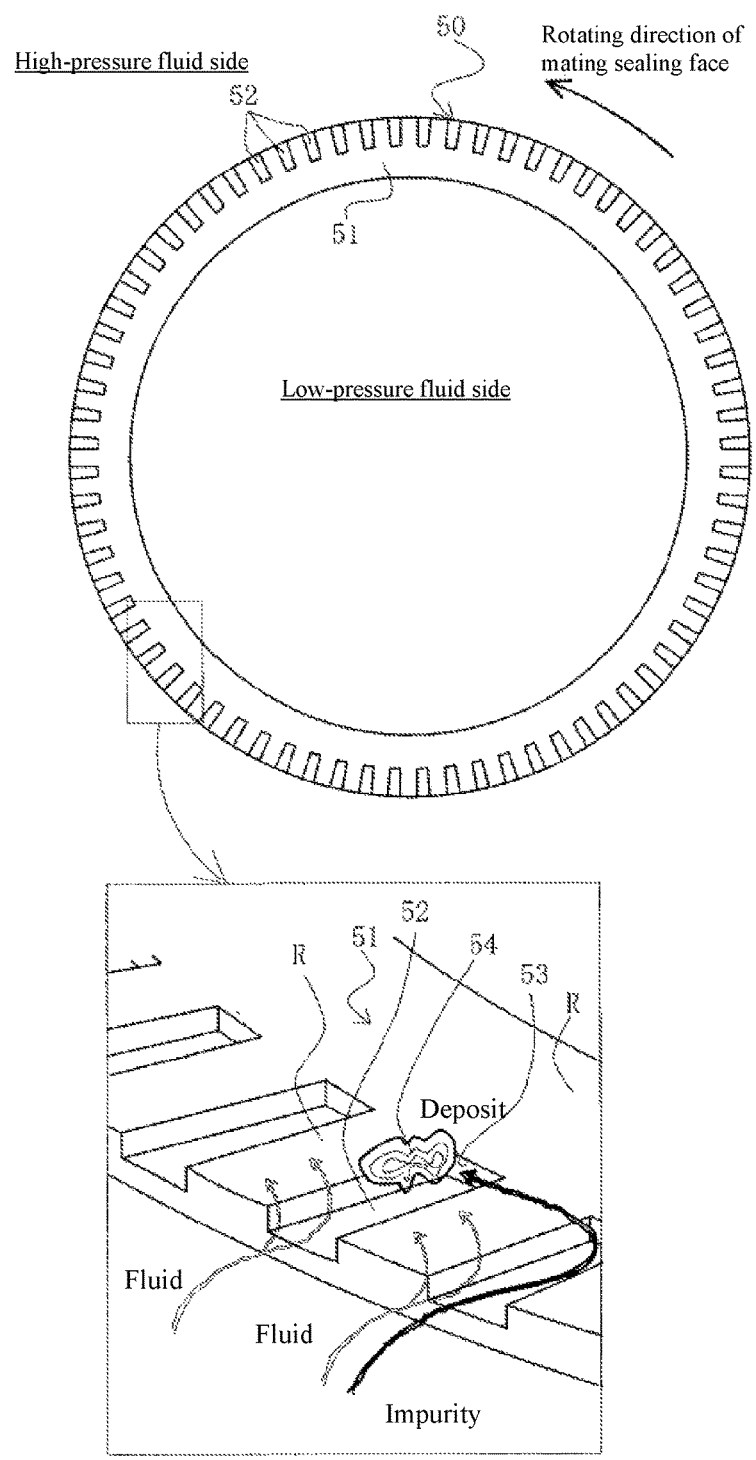

SLIDING COMPONENT

CROSS-REFERENCE TO RELATED APPLICATION

This application is a divisional of U.S. patent application Ser. No. 14/431,733, filed Mar. 26, 2015, now U.S. Pat. No. 9,951,873, issued Apr. 24, 2018, which in turn is a 35 U.S.C. § 371 application based on PCT/JP2014/050402, filed Jan. 14, 2014, which claims priority to Japanese Patent Application No. 2013-005494, filed Jan. 16, 2013.

TECHNICAL FIELD

The present invention relates to a sliding component suitable for mechanical seals, bearings and other sliding areas. In particular, the present invention relates to a seal ring, bearing, or other sliding component that must reduce friction by allowing a fluid to be present between the sealing faces, while preventing the fluid from leaking out of the sealing faces.

BACKGROUND ART

The performance of a mechanical seal, which is an example of a sliding component, is evaluated based on the leakage rate, wear rate, and torque. Mechanical seals of prior arts have achieved greater performance in the form of low leakage, long life, and low torque by optimizing their sealing material and roughness of seal area. In recent years, however, the ever-growing awareness of environmental issues in the market has created a demand for mechanical seals offering even higher performance and a consequent need to develop technologies that go beyond the scope of prior arts. One type of prior art relating to a mechanical seal is to provide grooves 52 on a sealing face 51 of one sliding ring 50 in order to obtain dynamic pressure between a pair of sliding rings that rotate relative to each other, as shown in FIG. 15 (refer to Patent Literature 1, for example).

CITATION LIST

Patent Literatures

Patent Literature 1: Japanese Utility Model Laid-open No. Sho 63-33027 (FIGS. 4 and 5)

SUMMARY OF INVENTION

Technical Problem

Under the aforementioned prior art, the grooves 52 are open to the high-pressure fluid side (sealed fluid side), but closed off from the low-pressure fluid side by a land R, with each groove 52 isolated from one another in the circumferential direction by the land R. Since the grooves 52 have a dead-end structure as mentioned above, the fluid entering each groove 52 is poorly circulated and if impurities have mixed into the fluid, the impurities may remain as deposits 54 at a downstream end 53 of the dead end and the deposits may even circulate over the sealing face 51 to damage the sealing face 51, or accumulating deposits may push the sealing faces of the pair of sliding rings wider apart to cause the sealed fluid to leak.

The object of the present invention is to provide a sliding component that allows the fluid entering the grooves for generating dynamic pressure (hereinafter referred to as "dynamic-pressure generation grooves") formed on its sealing face to circulate and thereby prevent the sealing face from being damaged by impurities contained in the fluid, while also preventing deposited impurities from pushing wider apart the sealing faces of the pair of sliding rings, thereby improving the lifespan as well as sealing function.

Solution to Problem

Principles

The present invention is such that the areas other than the land for generating dynamic pressure facing the high-pressure fluid side and the seal area facing the low-pressure fluid side are formed one step lower and these lower areas constitute fluid communication paths, in order to eliminate dead ends of dynamic-pressure generation grooves to allow the fluid to circulate and thereby prevent the sealing face from being damaged by impurities contained in the fluid, while preventing deposited impurities from pushing wider apart the sealing faces of the pair of sliding rings.

Means

To achieve the aforementioned object, firstly, the sliding component proposed by the present invention is the sliding component provided with a mechanism to generate dynamic pressure by means of relative sliding of a pair of sealing faces of the sliding component, which is characterized in that one sealing face is provided with a land for generating dynamic pressure facing the high-pressure fluid side and a seal area facing the low-pressure fluid side, wherein the land and seal area are positioned away from each other in the radial direction and the areas of the sealing face other than the land and seal area are formed lower than these areas to constitute fluid communication paths.

According to these features, the fluid entering the fluid communication path extending in the radial direction, from the high-pressure fluid side, is pressurized by means of the dynamic-pressure generating action of the land and positive pressure is generated, and consequently the space between the sealing faces is widened and the lubrication of the sealing faces improves as a result. As this happens, impurities contained in the fluid circulate in the fluid communication path and eventually are discharged toward the high-pressure fluid side by centrifugal forces, instead of damaging the sealing faces, and therefore the life of the sliding component can be extended significantly. In addition, impurities do not deposit on the sealing faces to widen the space between the sealing faces, which in turn leads to greater sealing function.

In addition, secondly, the sliding component proposed by the present invention is characterized in that, with regard to the first features, the land is provided at multiple locations at an equal pitch in the circumferential direction.

According to these features, required dynamic pressure is generated uniformly in the circumferential direction to improve the lubrication of the sealing face as a whole, while allowing the impurities contained in the fluid to be discharged without fail.

In addition, thirdly, the sliding component proposed by the present invention is characterized in that, with regard to the first or second features, the land has an approximately U-shaped profile and is positioned in such a way that the top of the approximate U shape faces the high-pressure fluid side.

According to these features, the presence of the dynamic-pressure generation area being elongated in the radial direction improves the lubrication and reduces the friction. Also, the fluid communication path extending in the radial direction communicates with the fluid communication path extending in the circumferential direction along a smooth arc, which allows the impurities contained in the fluid to be discharged without being stagrated in the middle and depositing. As a result, the sealing face is not damaged and this prevents the sealing face from corroding.

In addition, fourthly, the sliding component proposed by the present invention is characterized in that, with regard to the first or second features, the land has a quadrilateral profile and is positioned in such a way that one corner of the quadrilateral faces the high-pressure fluid side.

According to these features, the fluid communication path has a wide entrance facing the high-pressure fluid side and narrows toward the low-pressure fluid side after the entrance and then widens again near the fluid communication path extending in the circumferential direction, and this allows the impurities contained in the fluid to be further discharged.

In addition, fifthly, the sliding component proposed by the present invention is characterized in that, with regard to the first or second features, the land has a profile corresponding to multiple circles arranged in the radial direction.

According to these features, a seal structure suitable for thrust bearings can be provided and the impurities contained in the fluid can be discharged efficiently toward the high-pressure fluid side.

In addition, sixthly, the sliding component proposed by the present invention is characterized in that, with regard to any of the first through fifth features, the fluid communication path is provided with a spiral groove for discharging fluid.

According to these features, the fluid entering the fluid communication path is biased toward the high-pressure fluid side by the spiral groove for discharging fluid, and therefore the impurities contained in the fluid are further discharged toward the high-pressure fluid side by centrifugal forces and the biasing force from the spiral groove.

In addition, seventhly, the sliding component proposed by the present invention is characterized in that, with regard to any of the first through sixth features, a negative-pressure generation mechanism is provided on the high-pressure fluid side of the seal area provided in a manner facing the low-pressure fluid side.

In addition, eighthly, the sliding component proposed by the present invention is characterized in that, with regard to the seventh features, the negative-pressure generation mechanism is a reversed Rayleigh step mechanism.

According to these features, the fluid that would otherwise leak from the sealing face and fluid communication path toward the low-pressure fluid side flows into the negative-pressure generation mechanism and is discharged toward the high-pressure fluid side via the fluid communication path, which further reduces the leakage of fluid.

In addition, ninthly, the sliding component proposed by the present invention is characterized in that, with regard to any of the first through sixth features, a spiral groove for discharging fluid is provided on the high-pressure fluid side of the seal area provided in a manner facing the low-pressure fluid side.

According to these features, the fluid that would otherwise leak from the sealing face and fluid communication path toward the low-pressure fluid side is discharged toward the high-pressure fluid side by the spiral groove, which further reduces the leakage of fluid.

In addition, tenthly, the sliding component proposed by the present invention is characterized in that, with regard to any of the first through ninth features, the other sealing face is provided with a spiral groove for discharging fluid, which groove opens toward the high-pressure fluid side while being isolated from the low-pressure fluid side by the seal area.

According to these features, the fluid that would otherwise leak from the high-pressure fluid side toward the low-pressure fluid side can be further reduced. Furthermore, the spiral groove is isolated from the low-pressure fluid side by the seal area, which prevents the fluid from leaking in a stationary state.

In addition, eleventhly, the sliding component proposed by the present invention is characterized in that, with regard to any of the first through fifth features, dimples that assist in the generation of dynamic pressure are provided all around the one sealing face.

According to these features, the dimples function as dynamic-pressure assisting grooves to lower the speed at the fluid lubrication transition point of the sealing face, thereby achieving lower torque across all rotational speed regions.

In addition, twelfthly, the sliding component proposed by the present invention is characterized in that, with regard to any of the first through fifth features, a radial overhang connecting to the land is provided in at least one location of the seal area in the circumferential direction, while pumping grooves are provided at positions spaced from the seal area on the low-pressure fluid side in the radial direction, wherein the pumping grooves extend in the circumferential direction and their ends are positioned near the connection parts of the overhang and land.

According to these features, increase in torque can be suppressed even in high rotational speed regions.

In addition, thirteenthly, the sliding component proposed by the present invention is characterized in that, with regard to any of the first through fifth features, each land has a different length in the radial direction.

According to these features, the leakage rate and torque can be reduced.

In addition, fourteenthly, the sliding component proposed by the present invention is characterized in that, with regard to any of the first through thirteenth features, the one sealing face is given hydrophilizing treatment.

According to these features, lower torque can be achieved on the sealing face.

Advantageous Effects of Invention

The present invention achieves excellent effects as described below.

(1) The fluid entering the fluid communication path extending in the radial direction from the high-pressure fluid side is pressurized by means of the dynamic-pressure generating action of the land and positive pressure is generated, and consequently the space between the sealing faces is widened and the lubrication of the sealing faces improves as a result. As this happens, impurities contained in the fluid circulate in the fluid communication path and eventually are discharged toward the high-pressure fluid side by centrifugal forces, instead of damaging the sealing faces, and therefore the life of the sliding component can be extended significantly. In addition, impurities do not deposit on the sealing faces to widen the space between the sealing faces, which in turn leads to greater sealing function.

(2) The land is provided at multiple locations at an equal pitch in the circumferential direction, and accordingly required dynamic pressure is generated uniformly in the circumferential direction to improve the lubrication of the sealing face as a whole, while allowing the impurities contained in the fluid to be discharged without fail.

(3) A feature resides in that the land has an approximately U-shaped profile and is positioned in such a way that the top of the approximate U shape faces the high-pressure fluid side.

Accordingly to the feature, the presence of the dynamic-pressure generation area being elongated in the radial direction improves lubrication and reduces friction. Also, the fluid communication path extending in the radial direction communicates with the fluid communication path extending in the circumferential direction along a smooth arc, which allows the impurities contained in the fluid to be discharged without being stagnated in the middle and depositing. As a result, the sealing face is not damaged and this prevents the sealing face from corroding.

(4) The land has a quadrilateral profile and is positioned in such a way that one corner of the quadrilateral faces the high-pressure fluid side, and accordingly the fluid communication path has a wide entrance facing the high-pressure fluid side and narrows toward the low-pressure fluid side after the entrance and then widens again near the fluid communication path extending in the circumferential direction, and this allows the impurities contained in the fluid to be discharged further.

(5) The land has a profile corresponding to multiple circles arranged in the radial direction, and accordingly a seal structure suitable for thrust bearings can be provided and the impurities contained in the fluid can be discharged efficiently toward the high-pressure fluid side.

(6) The fluid communication path is provided with a spiral groove for discharging fluid, and accordingly the fluid entering the fluid communication path is biased toward the high-pressure fluid side by the spiral groove for discharging fluid, and therefore the impurities contained in the fluid are discharged further toward the high-pressure fluid side by centrifugal forces and the biasing force from the spiral groove.

(7) A negative-pressure generation mechanism is provided on the high-pressure fluid side of the seal area provided in a manner facing the low-pressure fluid side, and accordingly the fluid that would otherwise leak from the sealing face and fluid communication path toward the low-pressure fluid side flows into the negative-pressure generation mechanism and is discharged toward the high-pressure fluid side via the fluid communication path, which reduces the leakage of fluid further.

(8) A spiral groove for discharging fluid is provided on the high-pressure fluid side of the seal area provided in a manner facing the low-pressure fluid side, and accordingly the fluid that would otherwise leak from the sealing face and fluid communication path toward the low-pressure fluid side is discharged toward the high-pressure fluid side by the spiral groove, which reduces the leakage of fluid further.

(9) The other sealing face is provided with a spiral groove for discharging fluid that opens toward the high-pressure fluid side while being isolated from the low-pressure fluid side by the seal area, and accordingly the fluid that would otherwise leak from the high-pressure fluid side toward the low-pressure fluid side can be reduced further. Furthermore, the spiral groove is isolated from the low-pressure fluid side by the seal area, which prevents the fluid from leaking in a stationary state.

(10) Dimples that assist in the generation of dynamic pressure are provided all around the one sealing face, and accordingly the dimples function as dynamic-pressure assisting grooves to lower the speed at the fluid lubrication transition point of the sealing face, thereby achieving lower torque across all rotational speed regions.

(11) A radial overhang connecting to the land is provided in at least one location of the seal area in the circumferential direction, while pumping grooves are provided at positions spaced from the low-pressure fluid side of the seal area in the radial direction, wherein the pumping grooves extend in the circumferential direction and their ends are positioned near the connection parts of the overhang and land, and accordingly increase in torque can be suppressed even in high rotational speed regions.

(12) Each land has a different length in the radial direction, and accordingly the leakage rate and torque can be reduced.

(13) The one sealing face is given hydrophilizing treatment, and accordingly lower torque can be achieved on the sealing face.

BRIEF DESCRIPTION OF DRAWINGS

FIG. 1 is a longitudinal section view showing an example of a mechanical seal as the sliding component pertaining to Example 1 of the present invention.

FIG. 2 shows the sealing face of the sliding component pertaining to Example 1 of the present invention.

FIG. 3 shows the sealing face of the sliding component pertaining to Example 2 of the present invention.

FIG. 4 shows the sealing face of the sliding component pertaining to Example 3 of the present invention.

FIG. 5 shows the sealing face of the sliding component pertaining to Example 4 of the present invention.

FIG. 6 shows the sealing face of the sliding component pertaining to Example 5 of the present invention.

FIG. 7 shows the sealing face of the sliding component pertaining to Example 6 of the present invention.

FIG. 8 shows the sealing face of the sliding component pertaining to Example 7 of the present invention.

FIG. 9(a) shows the sealing face of the sliding component pertaining to Example 8 of the present invention, while (b) shows the torque test result of the sliding component.

FIG. 10 shows the sealing face of the sliding component pertaining to Example 9 of the present invention.

FIG. 11 shows the test results of the sliding component pertaining to Example 9, where (a) shows the torque test result and (b) shows the leak check test result.

FIG. 12 shows the sealing face of the sliding component pertaining to Example 10 of the present invention.

FIG. 13 shows the test results of the sliding component pertaining to Example 10, where (a) shows the torque test result and (b) shows the leak check test result.

FIG. 14 shows the test results of the sliding component pertaining to Example 11, where (a) and (b) show the torque test results, while (c) shows the comparison of torque test results when the flat sealing face is given and not given hydrophilizing treatment.

FIG. 15 is a drawing explaining prior art.

DESCRIPTION OF EMBODIMENTS

Modes for carrying out the present invention are explained below based on examples by referring to the drawings. Note, however, that the dimensions, materials, shapes, relative positions of components, etc. stated in these examples are not intended to limit the scope of the present invention to such dimensions, materials, shapes, and relative positions, unless expressly stated otherwise.

Example 1

The sliding component pertaining to Example 1 of the present invention is explained by referring to FIGS. 1 and 2.

In this example, a mechanical seal, which is an example of a sliding component, is explained. It should also be noted that, while the outer periphery side of the sliding component constituting the mechanical seal is referred to as the high-pressure fluid side (sealed fluid side) and the inner periphery side is referred to as the low-pressure fluid side (atmosphere side) in the explanation, the present invention is not limited to the foregoing and it can also be applied when the high-pressure fluid side and low-pressure fluid side are reversed.

FIG. 1 is a longitudinal section view showing an example of a mechanical seal of the inside type that seals the sealed fluid on the high-pressure fluid side that would otherwise leak from the outer periphery toward the inner periphery of the sealing face, wherein the mechanical seal comprises: one sliding part which is a circular rotating ring 3 and provided via a sleeve 2 on a rotating shaft 1 side that drives a pump impeller (not illustrated) on the high-pressure fluid side in a manner rotatable together with the rotating shaft 1; and the other sliding part which is a circular stationary ring 5 and provided on a pump housing 4 in a manner not rotating but movable in the axial direction; and sliding surfaces S that have been lapped or otherwise finished to a mirror surface are caused to slide against each other while in contact by means of a coiled wave spring 6 and bellows 7 that bias the stationary ring 5 in the axial direction. In other words, this mechanical seal prevents the sealed fluid from flowing out from the outer periphery of the rotating shaft 1 toward the atmosphere side between the respective sealing faces S of the rotating ring 3 and stationary ring 5.

FIG. 2 shows the sealing face of the sliding component pertaining to Example 1 of the present invention, and the example explained here assumes that a pumping groove is formed on the sealing face of the stationary ring 5 in FIG. 1.

The same applies when a pumping groove is formed on the sealing face of the rotating ring 3.

In FIG. 2, the outer periphery side of the sealing face of the stationary ring 5 represents the high-pressure fluid side (sealed fluid side), while the inner periphery side represents the low-pressure fluid side, such as the atmosphere side, and the mating sealing face rotates in the counterclockwise direction.

The sealing face of the stationary ring 5 is provided with a land 10 for generating dynamic pressure facing the high-pressure fluid side and a seal area 11 facing the low-pressure fluid side. The seal area 11 is constituted by a smooth area of the sealing face and provides sealing action. The land 10 and seal area 11 are positioned away from each other in the radial direction. In addition, the areas of the sealing face other than the land 10 and seal area 11 are formed lower than these areas and these lower areas constitute fluid communication paths 12.

In FIG. 2, the land 10 is provided at multiple locations at an equal pitch in the circumferential direction, and the respective lands are away from one another and independent. Then, a fluid communication path 12a extending in the radial direction is formed at multiple locations between adjacent lands 10, 10 in a manner facing the high-pressure fluid side. Also, a fluid communication path 12b extending in the circumferential direction is formed between the land 10 and seal area 11, and the multiple fluid communication paths 12a extending in the radial direction communicate with one another via the fluid communication path 12b extending in the circumferential direction. The width of each land 10 in the circumferential direction, widths of the fluid communication path 12a extending in the radial direction, and fluid communication path 12b extending in the circumferential direction, and depths of these fluid communication paths 12a, 12b, are set to optimal values based on the relative speed of the sealing faces, viscosity of the sealed fluid, and so on. For example, the width of each land 10 in the circumferential direction is set on the order of millimeters, and the widths of the fluid communication paths 12a, 12b are equal to or smaller than the width of the land 10 in the circumferential direction. The face of each land 10 is roughly at the same height as the seal area 11. In addition, the fluid communication path 12a extending in the radial direction and fluid communication path 12b extending in the circumferential direction are set 10 nm to 1 µm lower than the seal area 11, for example. Preferably the depth of the fluid communication path 12b is 1 µm or less, because if it is 1 µm or more, high dynamic pressure generates during high-speed rotation and the space between the sealing faces is widened excessively to cause leakage.

Now, if the rotating ring 3 rotates and the sealing faces S of the rotating ring 3 and stationary ring 5 are caused to slide relative to each other, the fluid entering the fluid communication path 12a extending in the radial direction from the high-pressure fluid side is pressurized by means of the dynamic-pressure generating action of the land 10 and positive pressure is generated, and consequently the space between the sealing faces S of the rotating ring 3 and stationary ring 5 is widened and the lubrication of the sealing faces S improves as a result. As this happens, impurities contained in the fluid circulate in the fluid communication path 12b in the circumferential direction and eventually are discharged toward the high-pressure fluid side by centrifugal forces, instead of damaging the sealing faces. In addition, impurities do not deposit on the sealing faces to widen the space between the sealing faces, and therefore the life of the sliding component can be extended significantly.

In the case of FIG. 2, the land 10 has a U-shaped profile and is positioned in such a way that the top of this U shape faces the high-pressure fluid side.

When the land 10 has a U-shaped profile, as is the case above, the presence of the dynamic-pressure generation area being elongated in the radial direction improves the lubrication and reduces the friction. Also, the fluid communication path 12a extending in the radial direction communicates with the fluid communication path 12b extending in the circumferential direction along a smooth arc, which allows the impurities contained in the fluid to be discharged without being stagnated in the middle and depositing. As a result, the sealing face is not damaged and this prevents the sealing face from corroding.

Example 2

The sliding component pertaining to Example 2 of the present invention is explained by referring to FIG. 3.

In Example 2, the basic constitution is the same as in Example 1, although the profile of the land is different from that in Example 1, and therefore the same members referenced in Example 1 are denoted by the same symbols used in Example 1 and duplicate explanations are omitted.

In FIG. 3, a land 15 has a profile being a variation of a U shape. To be specific, the land 15 has a U-shaped profile whose top has a normal shape but whose bottom (part near the low-pressure fluid side) is inclined by approx. 15 to 60° so that it faces the direction opposite the sliding direction of the mating sealing face. In a fluid communication path 16, therefore, a fluid communication path 16a extending in the radial direction is bent in a doglegged shape toward the upstream side.

Because the fluid communication path 16a extending in the radial direction is bent in a doglegged shape toward the upstream side, the generation of dynamic pressure by the fluid entering the fluid communication path 16a extending in the radial direction, from the high-pressure fluid side, is improved further. And, even in this case, the fluid communication path 16a extending in the radial direction communicates with a fluid communication path 16b extending in the circumferential direction along a smooth arc, which allows the impurities contained in the fluid to be discharged without being stagnated in the middle.

Under the present invention, the U shape and all variations of U shape are collectively referred to as "approximate U shape."

Example 3

The sliding component pertaining to Example 3 of the present invention is explained by referring to FIG. 4.

In Example 3, the basic constitution is the same as in Example 1, although the profile of the land is different from that in Example 1, and therefore the same members referenced in Example 1 are denoted by the same symbols used in Example 1 and duplicate explanations are omitted.

In FIG. 4, a land 20 has a quadrilateral profile and is positioned in such a way that one corner 20a of the quadrilateral faces the high-pressure fluid side. In addition, an opposing corner 20b of the corner 20a facing the high-pressure fluid side faces the low-pressure fluid side. Furthermore, a diagonal line 20c connecting the corner 20a and opposing corner 20b is longer than the diagonal lines connecting the other corners and inclined from the low-pressure fluid side toward the high-pressure fluid side in the rotating direction of the mating sealing face. In a fluid communication path 21, a fluid communication path 21a defined in the radial direction has a wide entrance facing the high-pressure fluid side, and narrows toward the low-pressure fluid side after the entrance and then widens again as it nears a fluid communication path 21b defined in the circumferential direction.

With the sliding component in Example 3, the fluid communication path 21a extending in the radial direction narrows toward the low-pressure fluid side and then widens again near the fluid communication path 21b in the circumferential direction, and accordingly impurities contained in the fluid flow easily into the fluid communication path 21b extending in the circumferential direction and are discharged further.

Example 4

The sliding component pertaining to Example 4 of the present invention is explained by referring to FIG. 5.

In Example 4, the basic constitution is the same as in Example 1, although the profile of the land is different from that in Example 1, and therefore the same members referenced in Example 1 are denoted by the same symbols used in Example 1 and duplicate explanations are omitted.

In FIG. 5, a land 25 has a profile corresponding to multiple circles arranged in the radial direction.

A circle 25a on the high-pressure fluid side is positioned near the outer periphery surface of the sealing face. On the other hand, a circle 25b on the low-pressure fluid side is positioned along the seal area 11 with a space left in between.

The sliding component in Example 4 represents a seal structure suitable for thrust bearings, where impurities contained in the fluid entering a fluid communication path 26a extending in the radial direction circulate in the circumferential direction via a fluid communication path 26b extending in the circumferential direction and are discharged toward the high-pressure fluid side by centrifugal forces.

Example 5

The sliding component pertaining to Example 5 of the present invention is explained by referring to FIG. 6.

In Example 5, the constitution is the same as in Example 1, except that a spiral groove for discharging fluid is added in the fluid communication path, which is different from Example 1, and therefore the same members referenced in Example 1 are denoted by the same symbols used in Example 1 and duplicate explanations are omitted.

In FIG. 6, a spiral groove 13 for discharging fluid is provided in the fluid communication path 12. This spiral groove 13 is formed by providing a spiral-shaped groove on the surface of the fluid communication path 12, where, in FIG. 6, the spiral groove 13 is inclined from the low-pressure fluid side (inner periphery side) toward the high-pressure fluid side (outer periphery side) in the rotating direction of the mating sealing face.

With the sliding component in Example 5, where the spiral groove 13 for discharging fluid is provided in the fluid communication path 12, the fluid enters the fluid communication path 12b extending in the circumferential direction, from the fluid communication path 12a extending in the radial direction, to be biased toward the high-pressure fluid side, in the fluid communication path 12, by the spiral groove 13 for discharging fluid. As a result, impurities contained in the fluid are discharged more easily toward the high-pressure fluid side by centrifugal forces and the biasing force from the spiral groove 13.

Example 6

The sliding component pertaining to Example 6 of the present invention is explained by referring to FIG. 7.

In Example 6, the constitution is the same as in Example 1, except that a negative-pressure generation mechanism or spiral groove for discharging fluid is provided on the high-pressure fluid side of the seal area, which is different from. Example 1, and therefore the same members referenced in Example 1 are denoted by the same symbols used in Example 1 and duplicate explanations are omitted.

In FIG. 7(a), a negative-pressure generation mechanism 30 is provided on the high-pressure fluid side of the seal area 11 provided on the low-pressure fluid side. In the case of FIG. 7, the negative-pressure generation mechanism 30 is constituted by a reversed Rayleigh step mechanism. This reversed Rayleigh step mechanism has a groove 30a formed on the seal area 11 and a reversed Rayleigh step 30b on the upstream side of the groove 30a, while the downstream side of the groove 30a is open to the fluid communication path 12b extending in the circumferential direction. Preferably the depth of the groove 30a is the same as or slightly less than the depth of the fluid communication path 12b in the circumferential direction. The reversed Rayleigh step mechanism 30 is provided at multiple locations at an equal pitch in the circumferential direction.

With the sliding component in Example 6, where the negative-pressure generation mechanism 30 is provided on the high-pressure fluid side of the seal area 11 provided on the low-pressure fluid side, the fluid that would otherwise leak from the sealing face and fluid communication path 12 toward the low-pressure fluid side flows into the negative-pressure generation mechanism 30 and is discharged toward the high-pressure fluid side via the fluid communication path 12, and leakage of fluid can be reduced as a result.

While the negative-pressure generation mechanism 30 is provided on the high-pressure fluid side of the seal area 11 provided on the low-pressure fluid side in FIG. 7(a), a spiral groove 13 for discharging fluid may be provided in place of the negative-pressure generation mechanism, as shown in FIG. 7(b).

Example 7

The sliding component pertaining to Example 7 of the present invention is explained by referring to FIG. 8.

In Example 7, the constitution of the one sealing face is the same as in Example 1, although a spiral groove for discharging fluid is provided on the other sealing face, which is different from Example 1, and therefore the same members referenced in Example 1 are denoted by the same symbols used in Example 1 and duplicate explanations are omitted.

In FIG. 8, FIG. 8(a) shows the sealing face of a stationary ring 5, while FIG. 8(b) shows the sealing face of a rotating ring 3.

As shown in FIG. 8(b), the sealing face of the rotating ring 3 is provided, across its entire surface, with spiral grooves 14 for discharging fluid, which grooves are open to the high-pressure fluid side but isolated from the low-pressure fluid side by the seal area 11.

With the sliding component in Example 7, the sealing face of the rotating ring 3, or specifically the other sealing face, is provided with spiral grooves for discharging fluid and therefore the fluid that would otherwise leak from the high-pressure fluid side toward the low-pressure fluid side can be reduced further. In addition, the spiral groove 14 is isolated from the low-pressure fluid side by the seal area 11, which prevents the fluid from leaking in a stationary state.

Example 8

The sliding component pertaining to Example 8 of the present invention is explained by referring to FIG. 9.

In Example 8, the constitution is the same as in Example 1, except that dimples that assist in the generation of dynamic pressure are provided all around on the one sealing face, which is different from Example 1, and therefore the same members referenced in Example 1 are denoted by the same symbols used in Example 1 and duplicate explanations are omitted.

In FIG. 9(a), dimples 30 that assist in the generation of dynamic pressure are provided all around the sealing face of the stationary ring 5, or specifically one sealing face on which a U-shaped land for generating dynamic pressure, seal area 11, and fluid communication path 12 are provided.

The dimples 30 are provided to the extent that a porosity (area ratio) of approx. 5% is achieved, for example, but the porosity may be higher or lower. Also, the dimples 30 may be extremely shallow with a depth of 100 nm or so, for example, but the depth is not limited in any specific way.

It should be noted that, while dimples 30 are provided all around the sealing face across its entire surface in FIG. 9(a), they need not be always provided in the fluid communication paths 12 (12a, 12b) representing areas lower than the land 10 and seal area 11.

The U shape or other shape in which the land 10 for generating dynamic pressure is provided affects the torque characteristics of the sliding component by causing the sealing face to undulate, sag, etc., and, in particular, sagging of the sealing face from the inner periphery side toward the outer periphery side of the sealing face in the radial direction suppresses the dynamic pressure effect and moves the fluid lubrication transition point of the sealing face toward the high speed side. When many extremely shallow dimples 30 are provided, however, at least in the land 10 of the sealing face as well as all around the seal area 11, these dimples 30 function as dynamic-pressure assisting grooves to lower the speed at the fluid lubrication transition point of the sealing face.

FIG. 9(b) shows the torque test results of the sliding component in Example 8 where dimples were provided on the sealing face and a sliding part where no dimples were provided, and in the test conducted by varying the rotational speed from 0 to 1000 and back to 0 rpm, the torque was consistently low in virtually all rotational speed regions with the sliding component in Example 8 where dimples were provided on the sealing face, but it was high at rotational speeds in a range from 0 to over 600 rpm with the sliding part where no dimples were provided.

In other words, the sliding component in Example 8 where dimples were provided on the sealing face could lower the speed at the fluid lubrication transition point and achieve lower torque across all rotating speed regions.

Example 9

The sliding component pertaining to Example 9 of the present invention is explained by referring to FIG. 10.

In Example 9, the constitution is the same as in Example 1, except that pumping grooves are provided on one sealing face in a manner extending in the circumferential direction at positions spaced from the low-pressure fluid side of the seal area in the radial direction, which is different from Example 1, and therefore the same members referenced in Example 1 are denoted by the same symbols used in Example 1 and duplicate explanations are omitted.

When FIG. 10 is referenced, the sealing face of the stationary ring 5, or specifically one sealing face where the U-shaped land 10 for generating dynamic pressure, seal area 11, and fluid communication path 12 are provided, is such that the seal area 11 has radial overhangs 11a connected to the land 10 at four equally distributed positions in the circumferential direction, with pumping grooves 32 provided from the low-pressure fluid side of the seal area 11 at four positions equally spaced in the radial direction. The pumping grooves 32 extend in the circumferential direction with their ends 32a, 32a bent outward in the radial direction, and are positioned near the connection part of the overhangs 11a and land 10.

While the overhang 11a on the seal area 11 and pumping grooves are provided at four equally distributed positions in the circumferential direction in FIG. 10, this is not the only possibility and it suffices to provide at least one. Also, the sliding component in FIG. 10 can be used in applications where it rotates in either direction because the pumping grooves 32 have a laterally symmetrical shape.

When FIG. 10(b) showing the section A-A of FIG. 10(a) is referenced, the pumping grooves 32 have an approximately rectangular section shape and are set shallower than the fluid communication path 12, for example.

As the sealing face of the stationary ring 5 slides relative to the mating sealing face, cavitation occurs in the pumping groove 32 and this cavitation causes the fluid on the seal area 11 on the low-pressure fluid side (inner periphery side) to be suctioned into the pumping groove 32. The fluid that has been suctioned into the pumping groove 32 generates dynamic pressure on the outer periphery side.

As described above, the formation of the pumping groove 32 causes the fluid that would otherwise leak toward the low-pressure fluid side to be transported toward the high-pressure fluid side (outer periphery side) to reduce the leakage rate, while also reducing the torque because the shear resistance decreases due to cavitation.

It should be noted that, while the pumping groove 32 is set shallower than the fluid communication path 12 in the example of FIG. 10, the groove depth is not limited to the foregoing and the groove may be set deeper than the fluid communication path 12.

FIG. 11(a) shows the torque test results of the sliding component pertaining to Example 9 where pumping grooves were provided on the sealing face and no pumping grooves were provided on a sliding part, and in the test conducted by varying the rotational speed from 0 to 1000 and back to 0 rpm, the torque of the sliding part where no pumping grooves were provided was high in virtually all rotational speed regions, and particularly in the region of approx. 500 rpm and higher rotational speeds, it was greater than the torque of the sliding component pertaining to Example 9 where pumping grooves were provided.

In other words, the sliding component pertaining to Example 9 where pumping grooves were provided on the sealing face can suppress increase in torque even in regions of high rotational speeds.

FIG. 11(b) shows the leak check test results of the sliding component pertaining to Example 9 where pumping grooves were provided on the sealing face and no pumping grooves were provided on a sliding part, and in the test conducted under the conditions of 8000 rpm in rotational speed and 015 MPaG in pressure, the leakage rate increased continuously after the start of test with the sliding part where no pumping grooves were provided on the sealing face, while the leakage rate was still as small as 3 ml even after an elapse of 70 hours with the sliding component pertaining to Example 9 where pumping grooves were provided on the sealing face.

In other words, with the sliding component pertaining to Example 9 where pumping grooves were provided on the sealing face, the leakage rate did not increase over time.

Example 10

The sliding component pertaining to Example 10 of the present invention is explained by referring to FIG. 12.

In Example 10, the constitution is the same as in Example 1, except that the multiple lands for generating dynamic pressure as provided in the circumferential direction have different lengths in the radial direction, which is different from Example 1, and therefore the same members referenced in Example 1 are denoted by the same symbols used in Example 1 and duplicate explanations are omitted.

When FIG. 12 is referenced, the multiple U-shaped lands 10 for generating dynamic pressure as provided in the circumferential direction are such that multiple lands 10 of different lengths in the radial direction are arranged at an equal pitch in a cyclical manner.

To be specific, the multiple lands 10 are constituted by five types of lands having different lengths in the radial direction, which are arranged, for example, in the order from longest to shortest—from the longest land 10-1 in the radial direction to the shortest land 10-5 in the radial direction—in the rotating direction of the mating sealing face, and then in the order of shortest to longest—from the shortest land 10-5 in the radial direction to the longest land 10-1 in the radial direction—in the rotating direction of the mating sealing face, and this is repeated in the circumferential direction.

In the case of FIG. 12, while the multiple lands 10 are constituted by five types of lands of different lengths in the radial direction, the number of types is not limited to five, so long as it is two or greater, for example. In addition, in FIG. 12, the structures are laterally symmetrical and thus can be used in applications where it rotates in either direction.

When the sealing face of the stationary ring 5 slides relative to the mating sealing face, cavitation occurs from downstream of the longer lands in the radial direction, while cavitation also occurs in the inner periphery parts of the shorter lands in the radial direction, as shown by hatching in the enlarged view of FIG. 12. If lands 10 of different lengths in the radial direction are arranged in the circumferential direction (this arrangement may be hereinafter referred to as "long-and-short U shape"), the area where cavitation occurs becomes wider compared to when lands of a constant length in the radial direction are arranged in the circumferential direction by equal numbers (this arrangement may be hereinafter referred to as "single-length U shape"), and consequently the leakage rate and torque can be reduced.

FIG. 13(a) shows the torque test results of the sliding component pertaining to Example 10 representing the long-and-short U shape and a sliding component representing the single-length U shape, and in the test conducted by varying the rotational speed from 0 to 1000 and back to 0 rpm, the torque of the sliding component representing the single-length U shape is greater in virtually all rotational speed regions, and particularly in the region of 500 rpm and higher rotational speeds, it is greater than the torque of the sliding component pertaining to Example 10 representing the long-and-short U shape.

In other words, the sliding component pertaining to Example 10 representing the long-and-short U shape can suppress increase in torque even in regions of high rotational speeds.

FIG. 13(b) shows the leakage check test results of the sliding component pertaining to Example 10 representing the long-and-short U shape and a sliding component representing the single-length U shape, and in the test conducted under the conditions of 8000 rpm in rotational speed and 015 MPaG in pressure, the leakage rate increased continuously after the start of test with the sliding component representing the single-length U shape, while the leakage rate was still as small as 3 ml even after an elapse of 70 hours with the sliding component pertaining to Example 10 representing the long-and-short U shape.

In other words, with the sliding component pertaining to Example 10 representing the long-and-short U shape, the leakage rate did not increase over time.

Example 11

The sliding component pertaining to Example 11 of the present invention is explained by referring to FIG. 14.

In Example 11, the constitution is the same as in Example 1, except that the sealing face was given hydrophilizing treatment, which is different from Example 1.

The study conducted by the inventor of the present application for patent revealed that, when the sliding component of Example 1 as shown in FIG. 2 was produced using a sample free from pores, etc., the sealing face could not retain liquid film and the torque tended to increase under high-temperature, high-speed conditions, but when it was produced using a sample whose sealing face had been hydrophilized, the sealing face could retain liquid film and exhibited fluid lubrication property even under high-temperature, high-speed conditions.

The method for the hydrophilizing treatment of the sealing face is not limited in any way, and examples include irradiating plasma onto the sealing face. Plasma irradiation can be implemented in several different ways, such as oxygen plasma irradiation, for example.

FIGS. 14(a) and (b) show the torque test results of the sliding component pertaining to Example 11.

When FIG. 14(a) is referenced that assumes a fluid temperature of 60° C. in the test conducted by varying the rotational speed from 0 to 1000 and back to 0 rpm, the "Untreated" sample whose sealing face was not hydrophilized presented greater torque at rotational speeds of 6000 rpm and higher compared to the "Hydrophilized" sample whose sealing face was hydrophilized.

Also when FIG. 14(b) is referenced, using a fluid temperature of 120° C., the "Untreated" sample whose sealing face was not hydrophilized presented greater torque in virtually all rotational speed regions compared to the "Hydrophilized" sample whose sealing face was hydrophilized, and the torque of the former increased notably at rotational speeds of approx. 3000 rpm and higher.

FIG. 14(c) shows the torque test results of samples whose flat sealing face was hydrophilized and not hydrophilized.

As shown in FIGS. 14(a) and (b), the torque-lowering effect was observed when the sealing face provided with a U-shaped land 10 for generating dynamic pressure, seal area 11, and fluid communication path 12, as shown in Example 1, was hydrophilized.

As shown in FIG. 14(c), however, the torque-lowering effect was not achieved when the flat sealing face not provided with a U-shaped land for generating dynamic pressure, etc., as shown in Example 1, was hydrophilized.

The above test results indicate that a specific effect manifests markedly when a sealing face provided with a U-shaped land 10 for generating dynamic pressure, seal area 11, and fluid communication path 12, as shown in Example 1, is hydrophilized.

The foregoing explained the examples of the present invention using the drawings, but specific constitutions are not limited to these examples and other modifications and additions are also included in the scope of the present invention so long as they do not deviate from the key points of the present invention.

For example, while the aforementioned examples primarily explained cases where the sliding part was used for either the rotating seal ring or stationary seal ring in a pair of rings constituting a mechanical seal device, the sliding part can also be used as a bearing that slides against a rotating shaft while sealing lubricating oil on one side of a cylindrical sealing face in the axial direction.

Additionally, while the aforementioned examples explained the so-called inside type characterized by the presence of high-pressure sealed fluid on the outer periphery side, for example, it goes without saying that the present invention can also be applied to the outside type characterized by the presence of high-pressure fluid on the inner periphery side.

In this case, the position of the land for generating dynamic pressure and that of the seal area are reversed in the radial direction.

Additionally, while the aforementioned examples explained cases where the land for generating dynamic pressure, fluid communication path, and seal area were provided on the sealing face of the stationary ring, for example, this is not the only possibility and the land for generating dynamic pressure, fluid communication path, and seal area can also be provided on the sealing face of the rotating ring.

REFERENCE SIGNS LIST

1 Rotating shaft
2 Sleeve
3 Rotating ring
4 Housing
5 Stationary ring
6 Coiled wave spring
7 Bellows
10 Land
11 Seal area
12 Fluid communication path
12a Fluid communication path extending in the radial direction
12b Fluid communication path extending in the circumferential direction
13 Spiral groove
14 Spiral groove
15 Land
16 Fluid communication path
16b Fluid communication path extending in the circumferential direction
20 Land
21 Fluid communication path
21a Fluid communication path extending in the radial direction
21b Fluid communication path extending in the circumferential direction
25 Land
26a Fluid communication path extending in the radial direction
26b Fluid communication path extending in the circumferential direction
30 Dimple
32 Pumping groove

The invention claimed is:
1. A sliding component comprising a stationary sliding member and a rotary sliding member forming a pair of sealing faces, and a mechanism to generate dynamic pressure resulting from—relative sliding of the pair of sealing faces, wherein one sealing face of the pair of sealing faces is provided with multiple lands along a circumferential direction for generating dynamic pressure facing a high-pressure fluid side and a seal area facing a low-pressure fluid side, wherein each land and the seal area are positioned away from each other in a radial direction and areas of the sealing face other than the lands and the seal area are formed lower than the lands and the seal area—to constitute fluid communication paths open to the high-pressure fluid side, wherein the fluid communication paths are constituted by (i) multiple radial fluid communication paths which form contours of the lands, and (ii) a circumferential fluid communication path formed in a circumferential direction between the seal area and the lands, wherein all of the lands are aligned in the circumferential direction, wherein the lands include at least two lands located at different circumferential positions and having different radial lengths, and wherein a distance between the land and the seal area become smaller as the radial length of the land is increased.

2. A sliding component according to claim 1, wherein—each land has an approximately U-shaped profile and is positioned such that a top of the approximate U shape faces the high-pressure fluid side.

3. A sliding component according to claim 1, wherein—the one sealing face is given hydrophilizing treatment.

4. A sliding component according to claim 1, wherein the lands are arranged in a cyclical manner in the circumferential direction.

5. A sliding component according to claim 4, wherein
the lands include multiple longest lands each of which has a longest radial length, and multiple shortest lands each of which has a shortest radial length and is arranged at a center position in the circumferential direction between adjoining two of the longest lands, and wherein assuming that the adjoining two of the longest lands are a first longest land and a second longest land, remaining lands other than the shortest land between the first longest land and the second longest land are arranged in such a manner that the length of the remaining land is smaller as the remaining land approaches the shortest land in the circumferential direction and that the length of the remaining land is longer as the remaining land approaches the second longest land in the circumferential direction.

6. A sliding component comprising a stationary sliding member and a rotary sliding member forming a pair of sealing faces, and a mechanism to generate dynamic pressure resulting from relative sliding of the pair of sealing faces, wherein one sealing face of the pair of sealing faces is provided with multiple lands along a circumferential direction for generating dynamic pressure facing a high-pressure fluid side and a seal area facing a low-pressure fluid side, wherein each land and the seal area are positioned away from each other in a radial direction and areas of the sealing face other than the lands and the seal area are formed lower than the lands and the seal area to constitute fluid communication paths open to the high-pressure fluid side, wherein the fluid communication paths are constituted by (i) multiple radial fluid communication paths which form contours of the lands, and (ii) a circumferential fluid communication path formed in a circumferential direction between the seal area and the lands, wherein all of the lands are aligned in a cyclical manner the circumferential direction, and wherein the lands include at least two lands located at different circumferential positions and having different radial lengths, wherein the lands include multiple longest lands each of which has a longest radial length, and multiple shortest lands each of which has a shortest radial length and is arranged at a center position in the circumferential direction between adjoining two of the longest lands, and wherein assuming that the adjoining two of the longest lands are a first longest land and a second longest land, remaining lands other than the shortest land between the first longest land and the second longest land are arranged in such a manner that the length of the remaining land is smaller as the remaining land approaches the shortest land in the circumferential direction and that the length of the remaining land is longer as the remaining land approaches the second longest land in the circumferential direction.

* * * * *